US012771858B2

(12) United States Patent
Wang et al.

(10) Patent No.: US 12,771,858 B2
(45) Date of Patent: Oct. 20, 2026

(54) IMAGE PROCESSING METHOD AND APPARATUS, AND STORAGE MEDIUM

(71) Applicant: HUAWEI TECHNOLOGIES CO., LTD., Shenzhen (CN)

(72) Inventors: Yichuan Wang, Beijing (CN); Quanhe Yu, Beijing (CN); Weiwei Xu, Hangzhou (CN); Hu Chen, Munich (DE); Hongjie You, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 18/793,919

(22) Filed: Aug. 4, 2024

(65) Prior Publication Data

US 2024/0397070 A1 Nov. 28, 2024

Related U.S. Application Data

(63) Continuation of application No. PCT/CN2022/132924, filed on Nov. 18, 2022.

(30) Foreign Application Priority Data

Feb. 15, 2022 (CN) ......................... 202210139291.7
May 5, 2022 (CN) ......................... 202210482398.1

(51) Int. Cl.
*H04N 19/30* (2014.01)
*G06T 3/40* (2006.01)
(Continued)

(52) U.S. Cl.
CPC ............... *H04N 19/30* (2014.11); *G06T 3/40* (2013.01); *H04N 9/64* (2013.01); *H04N 19/136* (2014.11); *H04N 19/182* (2014.11); *H04N 19/70* (2014.11)

(58) Field of Classification Search
None
See application file for complete search history.

(56) References Cited

U.S. PATENT DOCUMENTS

2016/0027161 A1* 1/2016 Aydin ....................... G06T 5/92 382/162
2019/0005630 A1* 1/2019 Li ............................. G06T 5/92
2020/0286213 A1 9/2020 Unger et al.

FOREIGN PATENT DOCUMENTS

CN 103702116 A 4/2014
CN 111491168 A 8/2020
(Continued)

OTHER PUBLICATIONS

Min Chen et al.: "JPEG Compatible Coding of High Dynamic Range Imagery using Tone Mapping Operators", Picture Coding Symposium, Apr. 24, 2006, XP030080209, total 6 pages.
(Continued)

*Primary Examiner* — Lennin R Rodriguezgonzalez

(57) ABSTRACT

The present disclosure discloses an image processing method, apparatus, and a storage medium. The method includes: parsing an original bitstream of a to-be-processed image to obtain the to-be-processed image; parsing a first layered bitstream of the to-be-processed image to obtain a first layered image of the to-be-processed image; determining a second layered image of the to-be-processed image based on the to-be-processed image and the first layered image, where one of the first layered image and the second layered image is a base layer image, and the other of the first layered image and the second layered image is a detail layer image; performing tone mapping on the base layer image to obtain a mapping result of the base layer image; and fusing the mapping result of the base layer image and the detail layer image.

20 Claims, 11 Drawing Sheets

(51) Int. Cl.
*H04N 9/64* (2023.01)
*H04N 19/136* (2014.01)
*H04N 19/182* (2014.01)
*H04N 19/70* (2014.01)

(56) References Cited

FOREIGN PATENT DOCUMENTS

| | | | |
|---|---|---|---|
| JP | 2013535135 | A | 9/2013 |
| JP | 2016522588 | A | 7/2016 |

OTHER PUBLICATIONS

ST 2086:2014-SMPTE Standard-Mastering Display Color Volume Metadata Supporting High Luminance and Wide Color Gamut Images. Oct. 14, 2014.total 6 pages.

IBC 2015:"High Dynamic Range". European Broadcasting Union. Aug. 25, 2015, Retrieved Nov. 1, 2015, total 1 page.

Recommendation ITU-R BT.2100-2: Image parameter values for high dynamic range television for use in production and international programme exchange. Oct. 30, 2023 ,total 16 pages.

Chen Wei et al."Deep Retinex Decomposition for Low-Light Enhancement",BMVC 2018,total 12 pages.

Hong Cheng et al. A Detail-maintained Tone Mapping Algorithm Based on Weighted Least Squares Filter, Nov. 22-24, 2019, total 8 pages.

* cited by examiner

IMAGE PROCESSING METHOD AND APPARATUS, AND STORAGE MEDIUM

CROSS-REFERENCE TO RELATED APPLICATIONS

This application is a continuation of International Application No. PCT/CN2022/132924, filed on Nov. 18, 2022, which claims priority to Chinese Patent Application No. 202210139291.7, filed on Feb. 15, 2022, and Chinese Patent Application No. 202210482398.1, filed on May 5, 2022. All of the aforementioned patent applications are hereby incorporated by reference in their entireties.

TECHNICAL FIELD

The present disclosure relates to the field of image processing, and in particular, to an image processing method and apparatus, and a storage medium.

BACKGROUND

Currently, image processing technologies are widely applied in various scenarios to improve image quality. Usually, conversion between a high dynamic range (HDR) image and a low dynamic range (LDR) image is implemented by using an image layering method and a tone mapping method.

An image mainly includes luminance information and edge (contour) information. The luminance information determines an overall view of the image. The edge (contour) information reflects an essential attribute of an object in the image, and does not significantly change with luminance. Therefore, for the two types of information included in the image, the image may be decomposed into a base layer image and a detail layer image, and this technology is referred to as an image layering technology.

In the image field, a dynamic range (DR) represents a ratio of a maximum grayscale value to a minimum grayscale value within a displayable range of an image. A dynamic range of nature is large. For example, luminance of a night scene in a starry sky is about 0.01 candela (candela) per square meter (which may be abbreviated as $cd/m^2$). For another example, luminance of the sun is as high as 1,000,000,000 $cd/m^2$. The dynamic range of nature may reach an order of magnitude of $10^{13}$. However, a displayable dynamic range of an image shot by a camera is small. To ensure imaging effect, the dynamic range needs to be reduced, and features like a contrast and details of an HDR image needs to be maintained as much as possible. This process is referred to as tone mapping (TM).

In the conventional technology, a manner of converting an HDR image into a LDR image is undiversified. Usually, preprocessing is performed on the HDR image, including converting color space of the HDR image into CIELab (International Commission on illumination (usually abbreviated CIE for its French name, Commission internationale de l'éclairage) Lab), performing HDR image normalization, and the like. Image layering is performed on a preprocessed HDR image by using a fast bilateral filtering method, tone mapping and saturation adjustment are performed on a base layer image, and processing is performed on a detail layer image. Finally, a processed base layer image and a processed detail layer image are combined to form a compressed LDR image. Because in this manner, the foregoing fixed image processing method is used in a same device, different HDR images cannot be flexibly adjusted to achieve optimal image processing effect.

SUMMARY

Embodiments of this application provide an image processing method and apparatus, and a storage medium, to support different image layering methods, provide a flexible image fusion manner, and help improve image processing effect.

To achieve the foregoing objective, embodiments of this application provide the following technical solutions.

According to a first aspect, an image processing method is provided, including: parsing an original bitstream of a to-be-processed image to obtain the to-be-processed image; parsing a first layered bitstream of the to-be-processed image to obtain a first layered image of the to-be-processed image; determining a second layered image of the to-be-processed image based on the to-be-processed image and the first layered image, where the first layered image is a base layer image, and the second layered image is a detail layer image; or the first layered image is a detail layer image, and the second layered image is a base layer image; performing tone mapping on the base layer image to obtain a mapping result of the base layer image; and fusing the mapping result of the base layer image and the detail layer image.

In a current HDR image-based processing manner, a fixed image layering method, tone mapping method, image fusion method, and the like are used, so that optimal effect cannot be achieved in image processing. In this case, according to the image processing method provided in this application, an image processing apparatus parses the original bitstream and a bitstream of the first layered image to obtain the to-be-processed image and the first layered image, obtains the second layered image based on the to-be-processed image and the first layered image, and performs image processing on the first layered image and the second layered image separately. A processing method for different layered images may be flexibly adjusted, and image fusion is performed on the flexibly processed first layered image and second layered image, to help improve image processing effect. In other words, in this application, an image layering task in a process of compressing an HDR image may be placed in another device other than the image processing apparatus. However, in the conventional technology, image layering and a process of processing and fusing an image obtained after layering are performed in a same device. In an implementation process of a plurality of image processing steps, the same device inevitably imposes a limitation. The method in this application helps achieve effect of not limiting a specific method of image layering. Another device sends a bitstream obtained after image layering to the image processing apparatus, and the image processing apparatus performs flexible processing and fusion based on the layered image, to help improve image processing effect of compressing the HDR image.

In a possible implementation, the first layered bitstream is a downsampled bitstream, and the parsing a first layered bitstream of the to-be-processed image to obtain a first layered image of the to-be-processed image includes: parsing the first layered bitstream of the to-be-processed image to obtain a first initial layered image of the to-be-processed image; and performing upsampling on the first initial layered image to obtain the first layered image.

In this possible implementation, the image processing apparatus has an upsampling function, and a transmitted bitstream is a bitstream obtained after downsampling, that is, a data amount of the transmitted bitstream is small. This helps occupy fewer resources in a bitstream transmission process, thereby reducing use of a bandwidth.

In a possible implementation, the first layered image and the second layered image are single-channel images, or the first layered image and the second layered image are multi-channel images.

In this possible implementation, a specific form of the image is not limited, and this helps improve flexibility and implementability of the solution.

In a possible implementation, the fusing the mapping result of the base layer image and the detail layer image includes: obtaining a processed detail layer image based on the detail layer image and a weight coefficient, where the weight coefficient represents superposition strength of the detail layer image; and fusing the mapping result of the base layer image and the processed detail layer image.

In this possible implementation, a specific implementation of image fusion is provided. A processing degree of the detail layer image is flexibly changed, so that personalized processing is provided for different images, and image processing effect is improved.

In a possible implementation, before the parsing an original bitstream of a to-be-processed image and parsing a first layered bitstream of the to-be-processed image, the method further includes: receiving dual bitstreams, where the dual bitstreams include the original bitstream and the first layered bitstream.

In this possible implementation, the image processing apparatus performs synchronization processing based on the to-be-processed image and the layered image, and performs fusion on the processed image.

According to a second aspect, an image processing apparatus is provided, including a functional unit configured to perform any method provided in the first aspect, where an action performed by each functional unit is implemented by hardware or implemented by hardware executing corresponding software. For example, the image processing apparatus may include a parsing unit, a determining unit, a tone mapping unit, and a fusion unit. The parsing unit is configured to parse an original bitstream of a to-be-processed image to obtain the to-be-processed image; the parsing unit is further configured to parse a first layered bitstream of the to-be-processed image to obtain a first layered image of the to-be-processed image; the determining unit is configured to determine a second layered image of the to-be-processed image based on the to-be-processed image and the first layered image, where the first layered image is a base layer image, and the second layered image is a detail layer image; or the first layered image is a detail layer image, and the second layered image is a base layer image; the tone mapping unit is configured to perform tone mapping on the base layer image to obtain a mapping result of the base layer image; and the fusion unit is configured to fuse the mapping result of the base layer image and the detail layer image.

For technical effect brought by the implementations of the second aspect, refer to technical effect brought by corresponding implementations of the first aspect.

According to a third aspect, an image processing method is provided, including: receiving an original bitstream of a to-be-processed image and a first layered bitstream of the to-be-processed image; discarding the first layered bitstream; parsing the original bitstream to obtain the to-be-processed image; performing image layering on the to-be-processed image to obtain a base layer image and a detail layer image; performing tone mapping on the base layer image to obtain a mapping result of the base layer image; and fusing the mapping result of the base layer image and the detail layer image.

It is considered that the existing partial image processing apparatus does not have a dual bitstream processing capability, by using the image processing method provided in this application, after the original bitstream and the first layered bitstream are received, the first layered bitstream may be discarded, the original bitstream is parsed to obtain the to-be-processed image, and image layering, tone mapping, and fusion are performed on the to-be-processed image according to the existing image processing manner, to obtain a fused image. In the foregoing manner, backward compatibility and robustness of the image processing apparatus device are improved.

According to a fourth aspect, an image processing apparatus is provided, including a functional unit configured to perform any method provided in the third aspect, where an action performed by each functional unit is implemented by hardware or implemented by hardware executing corresponding software. For example, the image processing apparatus may include a receiving unit, a processing unit, a parsing unit, a tone mapping unit, and a fusion unit. The receiving unit is configured to receive an original bitstream of a to-be-processed image and a first layered bitstream of the to-be-processed image; the processing unit is configured to discard the first layered bitstream; the parsing unit is configured to parse the original bitstream to obtain the to-be-processed image; the processing unit is further configured to perform image layering on the to-be-processed image to obtain a base layer image and a detail layer image; the tone mapping unit is configured to perform tone mapping on the base layer image to obtain a mapping result of the base layer image; and the fusion unit is configured to fuse the mapping result of the base layer image and the detail layer image.

For technical effect brought by the implementations of the fourth aspect, refer to technical effect brought by corresponding implementations of the third aspect.

According to a fifth aspect, an image processing apparatus is provided, including a processor and an interface circuit. The processor receives or sends data by using the interface circuit, and the processor is configured to invoke program instructions stored in a memory, so that the image processing apparatus implements any method provided in the first aspect or the third aspect.

According to a sixth aspect, an image processing apparatus is provided, including a processor and a memory. The processor is connected to a memory, the memory is configured to store computer-executable instructions, and the processor executes the computer-executable instructions stored in the memory, to implement any method provided in the first aspect to the third aspect.

According to a seventh aspect, a chip is provided. The chip includes a processor and an interface circuit. The interface circuit is configured to receive code instructions and transmit the code instructions to the processor. The processor is configured to run the code instructions to perform any method provided in the first aspect or the third aspect.

According to an eighth aspect, a computer-readable storage medium is provided and includes computer-executable instructions. When the computer-executable instructions are executed on a computer, the computer is enabled to perform any method provided in the first aspect or the third aspect.

According to a ninth aspect, a computer program product is provided and includes computer-executable instructions.

When the computer-executable instructions are executed on a computer, the computer is enabled to perform any method provided in the first aspect or the third aspect.

For technical effect brought by any implementation in the fifth aspect to the ninth aspect, refer to technical effect brought by corresponding implementations in the first aspect or the third aspect. Details are not described herein again.

DESCRIPTION OF EMBODIMENTS

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, terms such as "an example" or "for example" are used to represent giving an example, an illustration, or a description. Any embodiment or design scheme described as an "example" or "for example" in this application should not be explained as being more preferred or having more advantages than another embodiment or design scheme. Exactly, use of the term "example", "for example", or the like is intended to present a related concept in a specific manner.

An embodiment of this application provides an image processing method, which may be applied to an image processing apparatus. A specific form of the image processing apparatus is not limited in this embodiment of this application. For example, the image processing apparatus may be a terminal apparatus. The terminal apparatus may be referred to as a terminal, user equipment (UE), a terminal device, a video coding device, an access terminal, a subscriber unit, a subscriber station, a mobile station, a remote station, a remote terminal, a mobile device, a user terminal, a wireless communication device, a user agent, a user apparatus, or the like. The terminal apparatus may be a mobile phone, a camera, a display, an augmented reality (AR) device, a virtual reality (VR) device, a tablet computer, a notebook computer, an ultra-mobile personal computer (UMPC), a netbook, a personal digital assistant (PDA), or the like.

Figure 1:
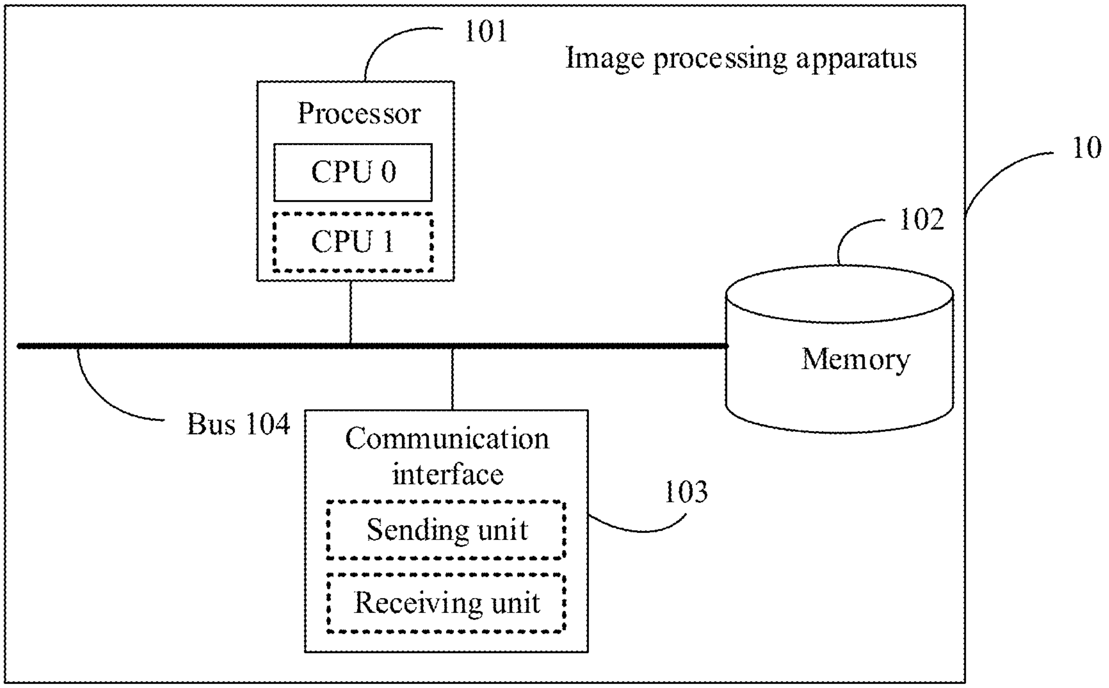
FIG. 1 is a diagram of a structure of an image processing apparatus according to an embodiment of this application.

In this application, a structure of the image processing apparatus may be shown in FIG. 1. FIG. 1 is a diagram of a hardware structure of an image processing apparatus 10 according to an embodiment of this application. The image processing apparatus 10 may be configured to implement a function of the image processing apparatus.

The image processing apparatus 10 shown in FIG. 1 may include a processor 101, a memory 102, a communication interface 103, and a bus 104. The processor 101, the memory 102, and the communication interface 103 may be connected through the bus 104.

The processor 101 is a control center of the image processing apparatus 10, and may be a general-purpose central processing unit (CPU), another general-purpose processor, or the like. The general-purpose processor may be a microprocessor, any conventional processor, or the like.

For example, the processor 101 may include one or more CPUs, for example, a CPU 0 and a CPU 1 that are shown in FIG. 1.

The memory 102 may be a read-only memory (ROM) or another type of static storage device capable of storing static information and instructions, a random access memory (RAM) or another type of dynamic storage device capable of storing information and instructions, an electrically erasable programmable read-only memory (EEPROM), a magnetic disk storage medium or another magnetic storage device, or any other medium capable of carrying or storing expected program code in a form of an instruction or data structure and capable of being accessed by a computer, but is not limited thereto.

In a possible implementation, the memory 102 may be independent of the processor 101. The memory 102 may be connected to the processor 101 through the bus 104, and is configured to store data, instructions, or program code. When invoking and executing the instructions or the program code stored in the memory 102, the processor 101 can implement an image processing method provided in embodiments of this application.

In another possible implementation, the memory 102 may alternatively be integrated with the processor 101.

The communication interface 103 is configured to connect the image processing apparatus 10 to another device by using a communication network. The communication network may be the Ethernet, a radio access network (RAN), a wireless local area network (WLAN), or the like. The communication interface 103 may include a receiving unit configured to receive data and a sending unit configured to send data.

The bus 104 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one bold line is used for representation in FIG. 1, but it does not represent that there is only one bus or one type of bus.

It should be noted that a structure shown in FIG. 1 does not constitute a limitation on the image processing apparatus 10. In addition to the components shown in FIG. 1, the image processing apparatus 10 may include more or fewer components than those shown in the figure, or combine some components, or have different component arrangements.

Figure 2:
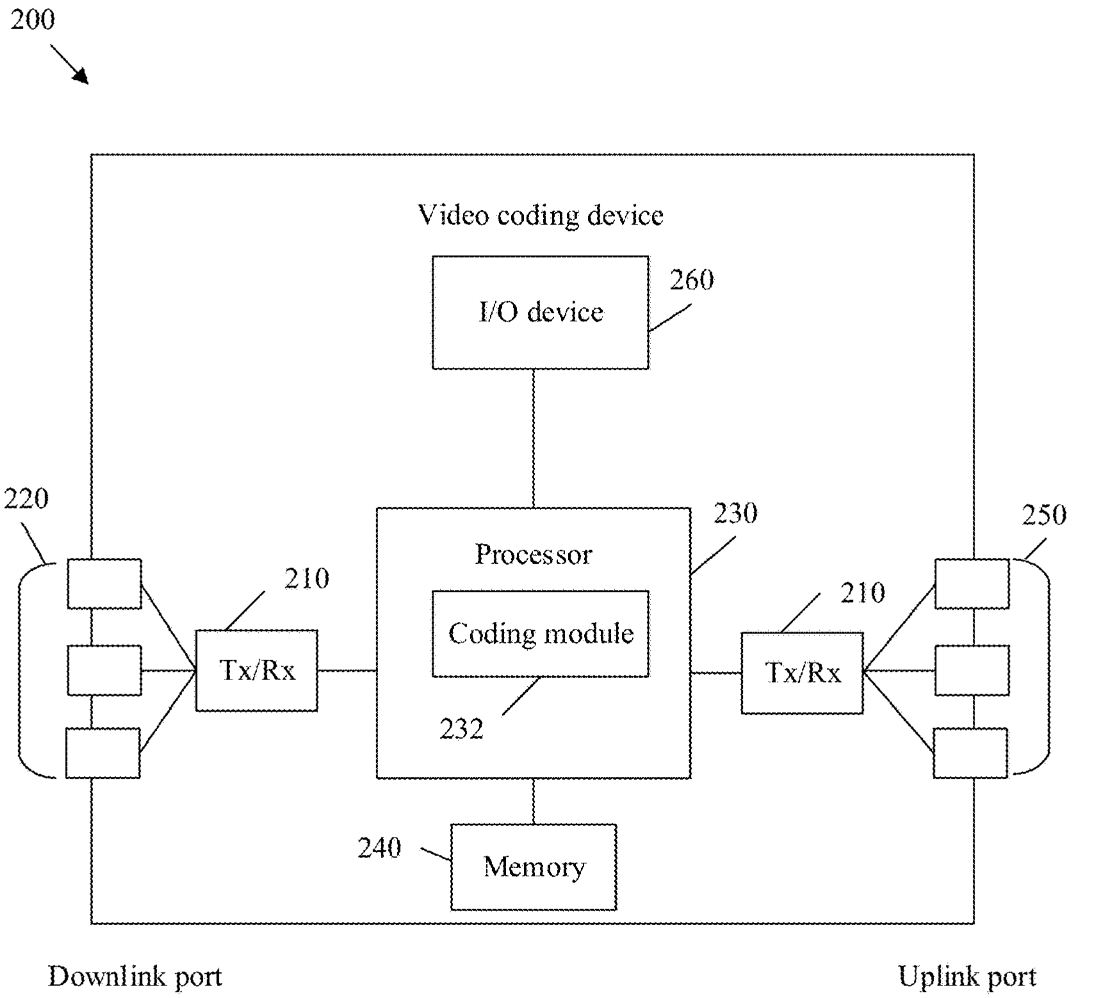
FIG. 2 is a diagram of a structure of a video coding device according to an embodiment of this application.

For example, when the image processing apparatus is a video coding device, the processor further includes a coding module. FIG. 2 is a diagram of a hardware structure of a video coding device 200 according to an embodiment of this application. The video coding device may be a decoding device or an encoding device. The video coding device 200 is suitable for implementing the disclosed examples/embodiments as described herein. The video coding device 200 includes a downlink port 220, an uplink port 250, and/or a transceiver unit (Tx/Rx) 210. The transceiver unit 210 includes a transmitter and/or a receiver configured to perform uplink and/or downlink data communication over a network. The video coding device 200 further includes a processor 230 and a memory 240. The video coding device 200 may further include an electrical component, an optical-to-electrical (OE) component, an electrical-to-optical (EO) component, and/or a wireless communication component coupled to the uplink port 250 and/or the downlink port 220 for communication of data via an electrical communication network, an optical communication network, or a wireless communication network. The video coding device 200 may further include input and/or output (I/O) devices 260 for communicating data to and from a user. The I/O devices 260 may include output devices such as a display for displaying video data, and a speaker for outputting audio data. The I/O devices 260 may also include input devices, such as a keyboard, mouse, trackball, and/or corresponding interfaces for interacting with such output devices.

The processor 230 is implemented through hardware and software. The processor 230 may be implemented as one or more CPU chips, one or more cores (for example, implemented as a multi-core processor), one or more field-programmable gate arrays (FPGAs), one or more application-specific integrated circuits (ASICs), and one or more digital signal processors (DSPs). The processor 230 is in communication with the downlink port 220, Tx/Rx 210, the uplink port 250, and the memory 240. The processor 230 includes a coding module 232. The coding module 232 implements steps of parsing a bitstream in the following disclosed embodiments, for example, steps S201 and S202 shown in FIG. 4. The coding module 232 may also implement any other method/mechanism described herein. In addition, the processor 230 further includes another module, configured to process an image parsed by the coding module 232, and a plurality of modules cooperate to complete the image processing method provided in this application.

It should be noted that the video coding device is configured to implement a video encoding/decoding function. Actually, the video encoding/decoding function may alternatively be implemented by using an apparatus of another form, for example, a decoding circuit.

Figure 3:
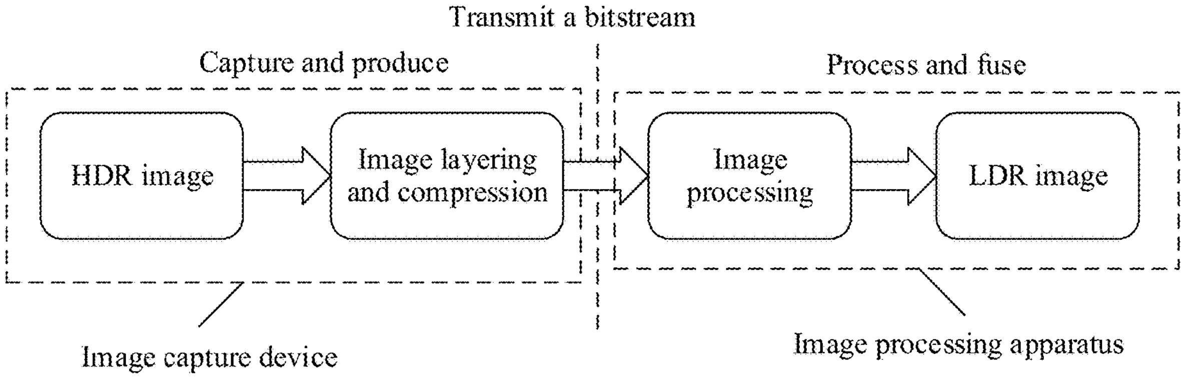
FIG. 3 is a schematic flowchart of an image capture device and an image processing apparatus according to an embodiment of this application.

Currently, a common method for image layering includes image layering by using a filter, or image layering by using an artificial intelligence (AI) method. The image layering is performed by using the filter, and a base layer image after the image layering is obtained by extracting low frequency information from the image, where the low frequency information is an area with a low grayscale value change; and a detail layer image after the image layering is obtained by extracting high frequency information from the image, where the high frequency information is an area with a high grayscale value change. It may be understood that the area with the low grayscale value change presents a gradient state in the image, and the area with the high grayscale value change presents a clear difference in the image, for example, a contour of an object. When the filter is used to perform image layering, hardware deployment needs to be performed on an image processing apparatus. Implementation costs and complexity are high, and maintenance and upgrade are inconvenient. When an AI method is used to perform image layering, a high computing capability of the image processing apparatus is required, and a network with good layering effect but a large scale cannot be deployed in this manner. In conclusion, in this application, an image layering task is placed in another device, and a specific method for image layering is not limited, so that the image processing apparatus can flexibly set an image processing manner, and different HDR images can be flexibly adjusted during image processing, to achieve optimal effect. As shown in FIG. 3, a capture device obtains an HDR image, performs pre-production on the HDR image, for example, performs image preprocessing, and then performs image layering. An image layering method is not limited in this application. A part of a layered image and an original image are compressed into a bitstream, and transmitted to the image processing apparatus provided in this application. The image processing apparatus parses the bitstream, separately performs image processing on layered images, and then obtains an LDR image through image fusion, to compress the HDR image. A flexible image processing and fusion method is used to improve compression effect of the HDR image. The following describes the technical solutions provided in embodiments of this application with reference to the accompanying drawings.

Figure 4:
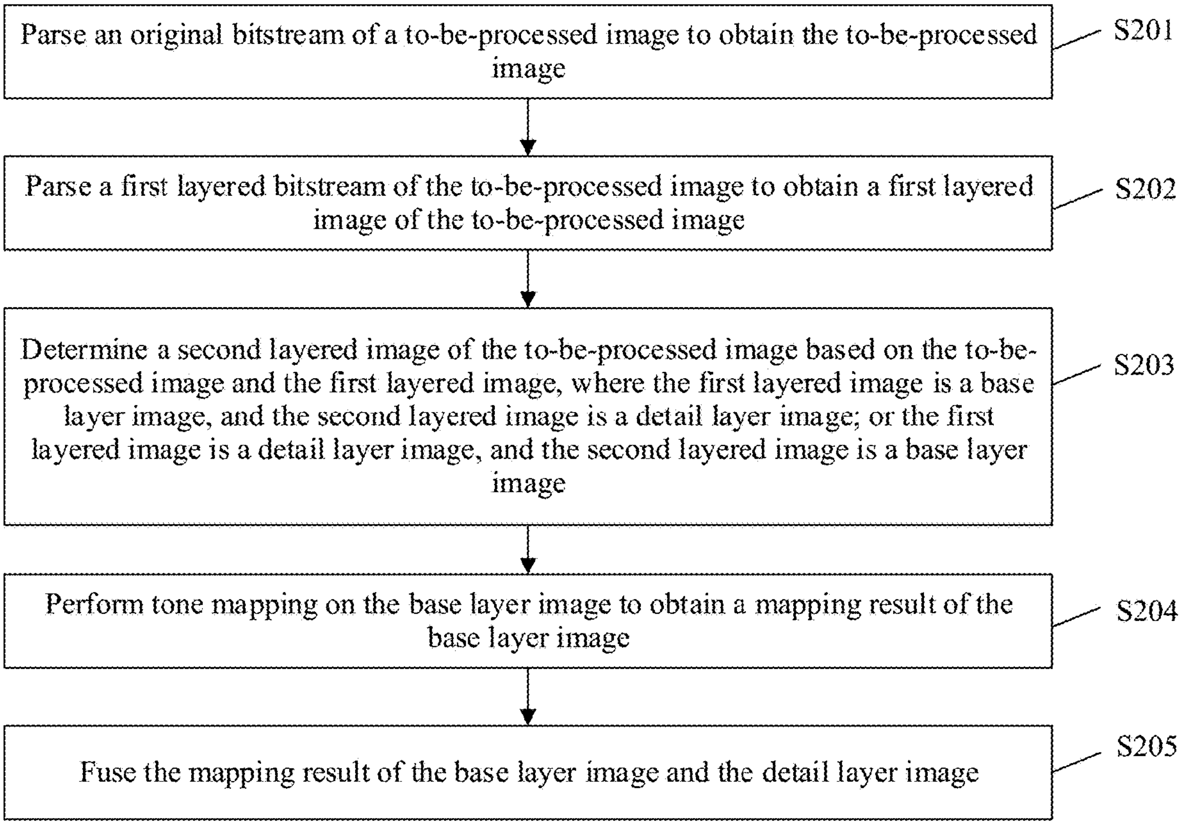
FIG. 4 is a schematic flowchart of an image processing method according to an embodiment of this application.

FIG. 4 is a flowchart of an image processing method according to this application. The method includes the following steps.

S201: An image processing apparatus parses an original bitstream of a to-be-processed image to obtain the to-be-processed image.

The original bitstream is a data stream that is sent to the image processing apparatus after the to-be-processed image is compressed. The image processing apparatus obtains the to-be-processed image by parsing the original bitstream.

S202: The image processing apparatus parses a first layered bitstream of the to-be-processed image to obtain a first layered image of the to-be-processed image.

The first layered bitstream is a data stream in which after image layering is performed on the to-be-processed image, an image at any layer after layering is compressed and sent to the image processing apparatus. The image processing apparatus obtains the first layered image by parsing the first layered bitstream.

The first layered image is a base layer image or a detail layer image.

Optionally, the first layered image is a single-channel image or a multi-channel image. A quantity of image channels is determined based on an image color mode. For example, when the image color mode is a red-green-blue (RGB) mode, it indicates that an image is formed by parameters of three channels: R, G, and B, and the image may be referred to as a three-channel image. For another example, when an image mode is a grayscale mode, the image is formed by a parameter of one channel, and the image may be referred to as the single-channel image. In addition, the multi-channel image further includes a dual-channel image, a four-channel image, and the like.

It should be noted that the to-be-processed image may be the single-channel image or the multi-channel image. When the to-be-processed image is the single-channel image, the first layered image is the single-channel image. When the to-be-processed image is the multi-channel image, the first layered image is the single-channel image or the multi-channel image. It is assumed that a quantity of channels of the to-be-processed image is N, and a quantity of channels of the first layered image is M, where N is an integer greater than 1, and $1 \leq M \leq N$.

Optionally, the first layered bitstream is a downsampled bitstream. The step S202 includes: The image processing apparatus parses the first layered bitstream of the to-be-processed image to obtain a first initial layered image of the to-be-processed image. The image processing apparatus performs upsampling on the first initial layered image to obtain the first layered image.

The first initial layered image is a downsampled image, and an image on which upsampling is performed is an upsampled image. The downsampled image is an image that is output after being zoomed out, and the upsampled image is an image that is output after being zoomed in.

It may be understood that, when the first layered bitstream is the downsampled bitstream, the image processing apparatus parses the first layered bitstream to obtain the first initial layered image, and performs upsampling on the first initial layered image, in other words, zooms in the first initial layered image, to obtain the first layered image. A resolution of the first layered image is the same as that of the to-be-processed image, so that a second layered image is subsequently obtained.

Optionally, before step S201 and step S202 are performed, the method further includes step S200: The image processing apparatus receives the original bitstream and the first layered bitstream.

The original bitstream and the first layered bitstream are single bitstreams or dual bitstreams transmitted to the image processing apparatus. An encapsulation format of the single bitstream is different from that of the dual bitstreams in the bitstream. When the original bitstream and the first layered bitstream are transmitted to the image processing apparatus in a form of the dual bitstreams, the image processing apparatus receives the dual bitstreams, where the dual bitstreams include the original bitstream of the to-be-processed image and the first layered bitstream of the to-be-processed image. The image processing apparatus may synchronously parse the original bitstream and the first layered bitstream, to obtain the to-be-processed image and the first layered image, and execute an image processing process. When the original bitstream and the first layered bitstream are transmitted to the image processing apparatus in a form of the single bitstream, the bitstream may further include synchronization information, where the synchronization information is used by the image processing apparatus to determine corresponding locations of pixels in the to-be-processed image and the first layered image, to implement image processing processes such as obtaining another layered image and performing image fusion.

It may be understood that, when the original bitstream and the first layered bitstream are transmitted to the image processing apparatus in the form of the dual bitstreams, the image processing apparatus performs synchronization processing based on the to-be-processed image and the layered image, and performs fusion on processed images, to reduce image processing time.

It should be noted that, in this application, a manner of parsing the original bitstream and the first layered bitstream is not strictly required. When the original bitstream and the first layered bitstream are transmitted to the image processing apparatus in the form of the dual bitstreams, the image processing apparatus receives the dual bitstreams, and may synchronously parse the dual bitstreams, or may separately parse the original bitstream and the first layered bitstream according to a sequence.

S203: The image processing apparatus determines the second layered image of the to-be-processed image based on the to-be-processed image and the first layered image. The first layered image is the base layer image, and the second layered image is the detail layer image; or the first layered image is the detail layer image, and the second layered image is the base layer image.

It may be understood that image layering is performed on the to-be-processed image, to obtain the base layer image and the detail layer image. Therefore, the to-be-processed image includes the base layer image and the detail layer image. The image processing apparatus obtains the second layered image by calculating a difference between the to-be-processed image and the first layered image.

Optionally, the image processing apparatus calculates a pixel difference between pixels of the to-be-processed image and the first layered image, and uses an image formed by the pixel difference as the second layered image.

Optionally, the image processing apparatus calculates a difference between the original bitstream and the first layered bitstream, and parses a calculated difference bitstream to obtain the second layered image.

It may be understood that the first layered image and the second layered image have a same quantity of channels. When the first layered image is a single-channel image, the second layered image is a single-channel image. When the first layered image is a multi-channel image, the second layered image is a multi-channel image with a same channel quantity.

Currently, for an HDR image, tone mapping is mainly performed on luminance information of the image, and then contour information of the image is fused to obtain a fused LDR image. A contrast of the image reflects a brightness degree in the image, and the brightness degree is determined based on the luminance information. To restore the contrast in the HDR image, tone mapping is generally performed on the luminance information of the image. In order to restore a detail feature in the HDR image, image processing is generally performed on the contour information of the image. Effect similar to that in the HDR image is achieved by luminance information and contour information through fusion, so that images with similar effect are presented to a user in different hardware devices.

The image processing apparatus extracts luminance information $Y_{source}$ of the to-be-processed image and luminance information $Y_1$ in the first layered image, and obtains luminance information $Y_2$ of the second layered image through calculation according to the following formula:

$$Y_2 = Y_{source} - Y_1.$$

Herein, the first layered image is the base layer image, and the second layered image is the detail layer image, where $Y_1$ may be represented as $Y_{base}$, and $Y_2$ may be represented as $Y_{detail}$; or the first layered image is the detail layer image, and the second layered image is the base layer image, where $Y_1$ may be represented as $Y_{detail}$, and $Y_2$ may be represented as $Y_{base}$.

It may be understood that the luminance information is in a unit of a pixel, and luminance information of each pixel is represented by using a pixel value. In a calculation process, a pixel value of each pixel is used for calculation.

S204: The image processing apparatus performs tone mapping on the base layer image to obtain a mapping result of the base layer image.

Figure 5:
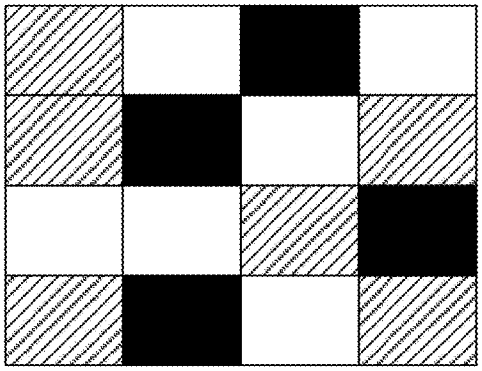
FIG. 5 is a diagram of a local tone mapping method according to an embodiment of this application.

A specific manner of tone mapping is not limited in this application. The tone mapping includes global tone mapping (GTM), local tone mapping (LTM), and AI tone mapping based on a deep neural network. The GTM means that pixel values of all pixels in the base layer image are mapped by using a same mapping function. The LTM means that pixel values of pixels in different areas in the base layer image are mapped by using different mapping functions. The LTM may divide an image into a plurality of image blocks, and a same mapping function or different mapping functions are used for the plurality of image blocks. For example, as shown in FIG. 5, an image is divided into a plurality of image blocks, and a same mapping function is used for image blocks filled in a same form. For example, an oblique image block indicates that a mapping function 1 is used for pixel values in the image block, a blank image block indicates that a mapping function 2 is used for pixel values in the image block, and a black image block indicates that a mapping function 3 is used for pixel values in the image block.

It should be noted that the image processing apparatus may use different tone mapping methods for different to-be-processed images, and the image processing apparatus may be selected according to a tone mapping method supported by a device.

Optionally, when the image processing apparatus supports at least two tone mapping methods, the image processing apparatus performs image processing by using a plurality of tone mapping methods for a same to-be-processed image, compares processing effect of different tone mapping methods, and selects a processing result with optimal effect.

S205: The image processing apparatus fuses the mapping result of the base layer image and the detail layer image.

The image processing apparatus superimposes the mapping result of the base layer image and the detail layer image, to obtain a fused image.

Optionally, the image processing apparatus obtains a processed detail layer image based on the detail layer image and a weight coefficient. The weight coefficient represents superposition strength of the detail layer image. The superposition strength indicates a proportion of the processed detail layer image in the fused image. The image processing apparatus fuses the mapping result of the base layer image and the processed detail layer image.

It may be understood that the current detail layer image includes high frequency information in the image. After the detail layer image is processed based on different weight coefficients, the high frequency information in the image is actually enhanced or weakened, so that the processed detail layer image and the mapping result of the base layer image has different effect during image fusion. In other words, different weight coefficients help enhance or weaken the high frequency information in the image, to indirectly affect a proportion of the high frequency information in the fused image in an image fusion process.

The processed detail layer image is $Y'_{detail}$, the weight coefficient is weight, and $Y'_{detail}$ is calculated in the following manner:

$$Y'_{detail} = Y_{detail} \times \text{weight}.$$

Herein, weight is a constant greater than 0. For example:

$$\text{weight} = \alpha.$$

Herein, $\alpha > 0$. The image processing apparatus fuses a pixel value in the detail layer image and a pixel value of the mapping result of the base layer image at same superposition strength;

or $$\text{weight} = \left(\left(\frac{Y_{tm}}{Y_{base}}\right) + \alpha\right)^{\beta}.$$

Herein, $\alpha > 0$, and $\beta > 0$. The image processing apparatus separately determines, based on pixel values of the mapping result of the base layer image, weight coefficients for fusion with the detail layer image. The image processing apparatus determines a ratio of each pixel value of the mapping result of the base layer image to a pixel value of a corresponding location in the base layer image, and determines a weight coefficient of the pixel based on the ratio.

After the image processing apparatus determines the processed detail layer image, the processed detail layer image is fused with the mapping result $Y_{tm}$ of the base layer image, and the fused image Y is calculated by using the following formula:

$$Y = Y_{tm} + Y'_{detail}.$$

Alternatively, Y may be represented as:

$$Y = Y_{tm} + Y_{detail} \times \text{weight}.$$

Through the steps S201 to S205, the image processing apparatus implements more flexible processing on the image. The image processing apparatus obtains the to-be-processed image and some layered images, performs diversified processing on the layered images, and adaptively adjusts image fusion effect. This helps improve the image processing effect and user experience.

Figure 6A:
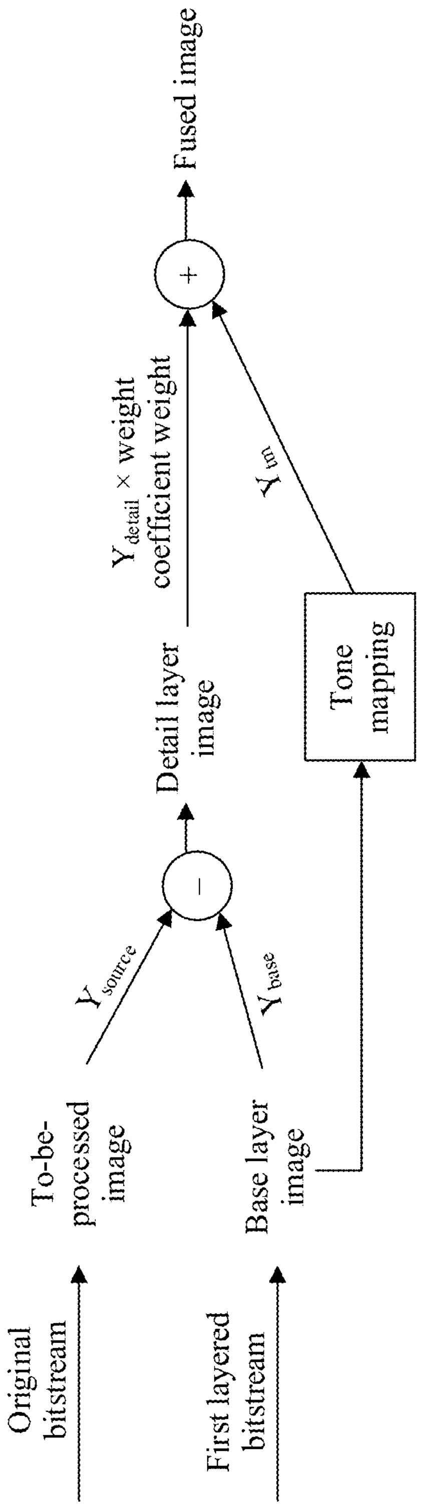
FIG. 6*a* is a schematic flowchart of an image processing method according to an embodiment of this application.
Figure 6B:
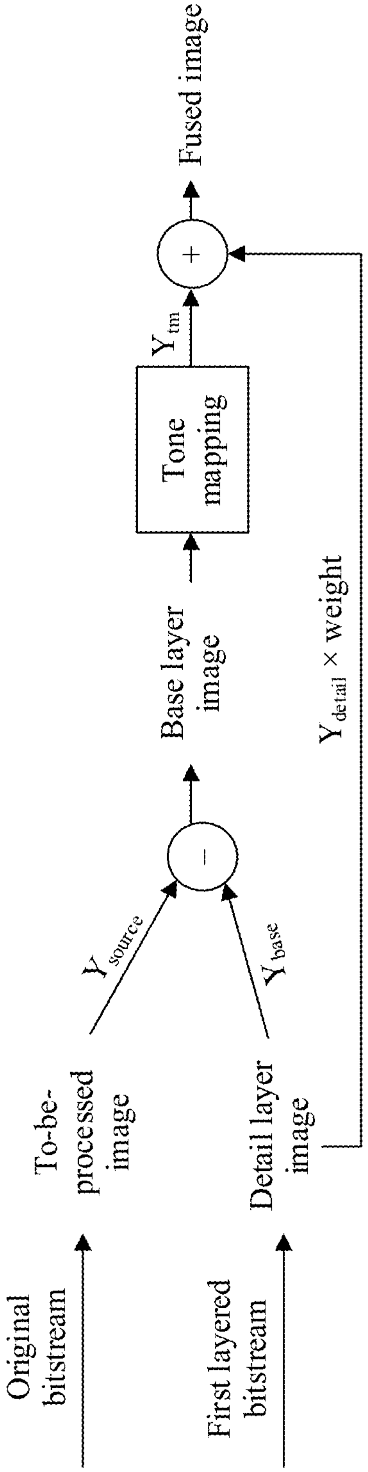
FIG. 6*b* is a schematic flowchart of an image processing method according to an embodiment of this application.

The steps S201 to S205 may be implemented by using a flowchart shown in FIG. 6*a* or FIG. 6*b*.

When the first layered bitstream is a bitstream of the base layer image, refer to an image processing process shown in FIG. 6*a*. When the first layered bitstream is a bitstream of the detail layer image, refer to an image processing process shown in FIG. 6*b*.

Figure 7:
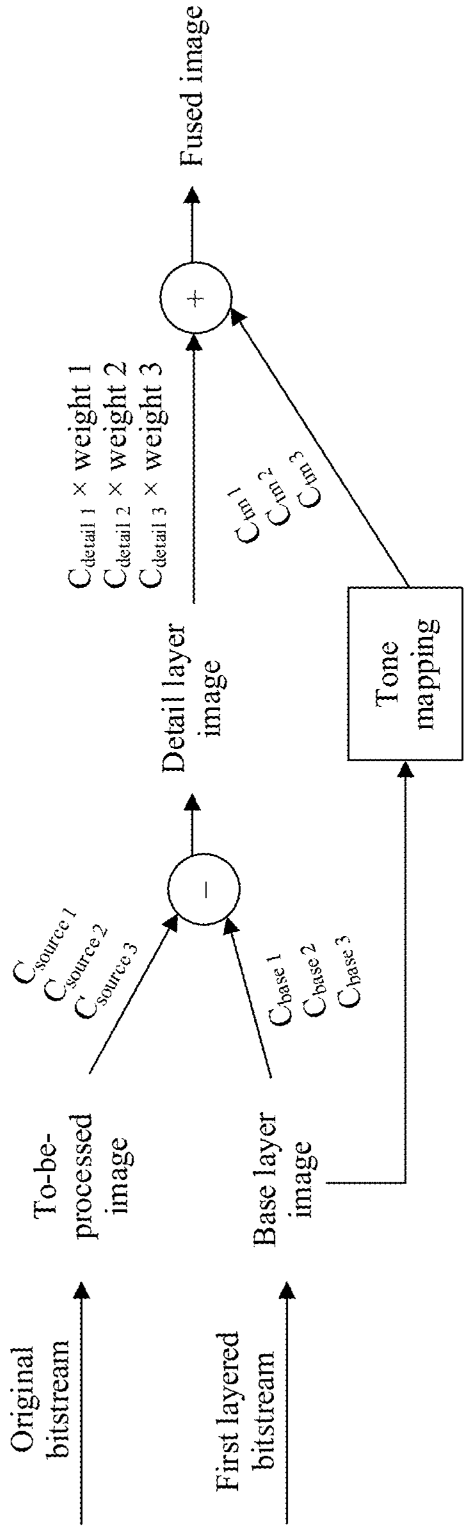
FIG. 7 is a schematic flowchart of a multi-channel image processing method according to an embodiment of this application.

Optionally, when an image obtained by the image processing apparatus by parsing the first layered bitstream is a multi-channel image (for example, a three-channel image), refer to an image processing process shown in FIG. 7.

Herein, weight 1=α1; weight=α2; and weight=α3, where
α1, α2, and α3 are all constants greater than zero;
or $$\text{weight1} = \left(\left(\frac{C_{tm1}}{C_{base1}}\right) + \alpha 1\right)^{\beta 1};\ \text{weight2} = \left(\left(\frac{C_{tm2}}{C_{base2}}\right) + \alpha 2\right)^{\beta 2};\ \text{and}$$

$$\text{weight3} = \left(\left(\frac{C_{tm3}}{C_{base3}}\right) + \alpha 3\right)^{\beta 3},$$

where

α1, α2, α3, β1, β2, and β3 are all constants greater than zero.

Correspondingly, the image processing apparatus calculates a pixel value of the fused image as follows:

$$C1 = C_{tm1} + C'_{detail1};\ C2 = C_{tm2} + C'_{detail2};\ \text{and}\ C3 = C_{tm3} + C'_{detail3}.$$

Herein, $$C'_{detail} = C_{detail} \times \text{weight}.$$

Therefore, the pixel value of the fused image may also be represented as:

$$C1 = C_{tm1} + C_{detail1} \times \text{weight1};\ C2 = C_{tm1} + C_{detail2} \times \text{weight2};$$

$$C3 = C_{tm1} + C_{detail3} \times \text{weight3}.$$

It may be understood that, when both the to-be-processed image and the first layered image are multi-channel images, each channel may independently perform image processing, and a fused image obtained through image processing is also a multi-channel image.

It should be noted that, in FIG. 7, an example in which the first layered image is a base layer image is used, and the first layered image may alternatively be a detail layer image. In an image processing process shown in FIG. 6*b*, a specific parameter involved is similar to that in FIG. 7. Details are not described again.

Figure 8:
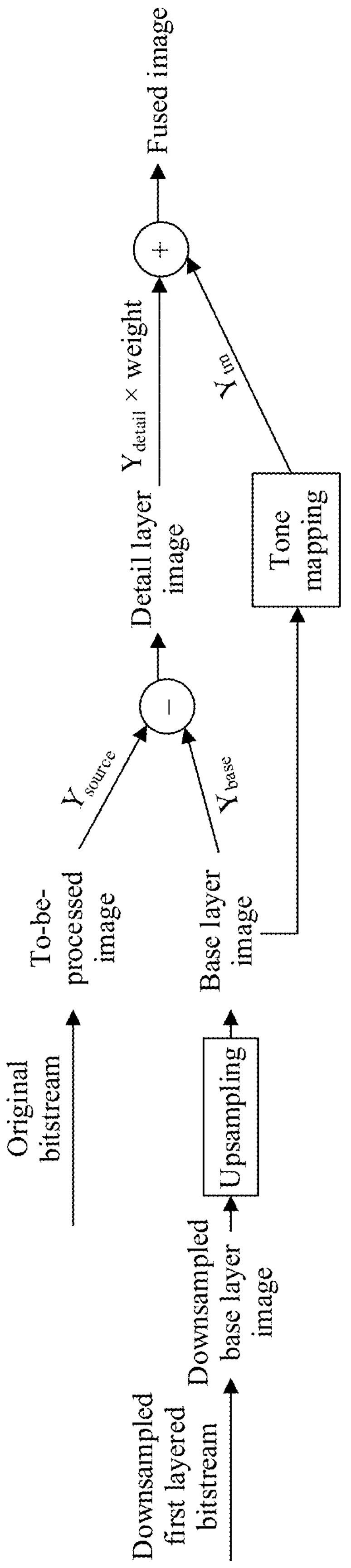
FIG. 8 is a schematic flowchart of a downsampled image processing method according to an embodiment of this application.

Optionally, when an image obtained by the image processing apparatus by parsing the first layered bitstream is a downsampled first layered image, the following uses a downsampled base layer image as an example. As shown in FIG. 8, the image processing apparatus performs upsampling on the downsampled base layer image to obtain a base layer image, and performs a subsequent image processing process.

It may be understood that, when the bitstream is a downsampled first layered bitstream and transmitted to the image processing apparatus, a transmission bandwidth is saved, and image processing efficiency is improved.

Figure 9:
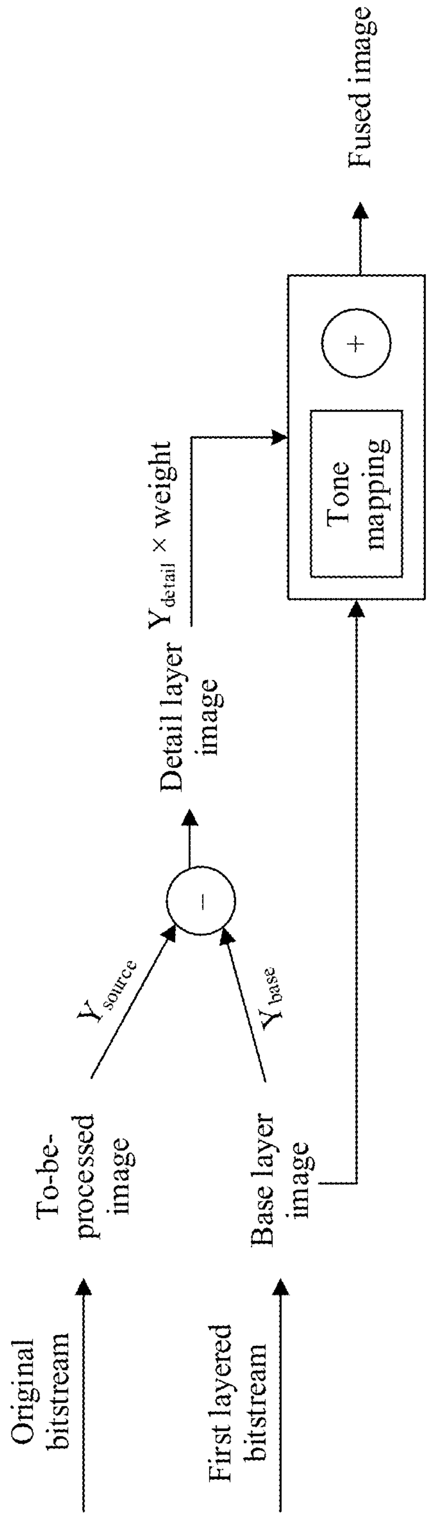
FIG. 9 is a schematic flowchart of an image processing method according to an embodiment of this application.

Optionally, another image processing and fusion manner after layering is provided. As shown in FIG. 9, tone mapping and image fusion are performed synchronously, and a fused image is output. It is considered that an overlay position of the detail layer image and the base layer image obtained through tone mapping, a more flexible selection is provided, which helps extend a path design of an image processing apparatus device, improve a possibility of achieving optimal effect of tone mapping, and help be compatible with an existing image processing device, to facilitate implementation.

Figure 10:
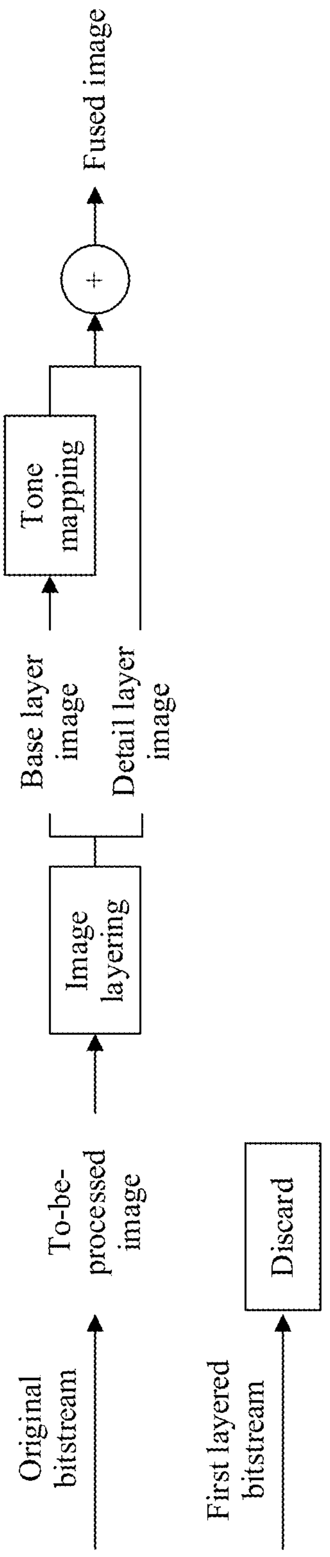
FIG. 10 is a schematic flowchart of an image processing method according to an embodiment of this application.

Optionally, it is considered that the existing partial image processing apparatus does not have a dual bitstream processing capability, as shown in FIG. 10, after receiving an original bitstream and a first layered bitstream, the image processing apparatus may discard the first layered bitstream, obtain a to-be-processed image by parsing the original bitstream, and perform image layering, tone mapping, and fusion on the to-be-processed image according to an existing image processing manner to obtain a fused image. In the foregoing manner, backward compatibility and robustness of the image processing apparatus device are improved.

Optionally, the bitstream mentioned above may be non-gamma (gamma) encoding, and a common format includes perceptual quantization (PQ), hybrid log-gamma (HLG), or the like.

The foregoing mainly describes the solutions in embodiments of this application from a perspective of a method. It may be understood that, to implement the foregoing functions, an image processing apparatus includes at least one of a corresponding hardware structure and a corresponding software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into functional units may be performed on the image processing apparatus based on the foregoing example of the method. For example, functional units may be divided based on corresponding functions, or two or more than two functions may be integrated into one processing unit. The integrated unit may be implemented in a form of hardware, or may be implemented in a form of a software function unit. It should be noted that, in this embodiment of this application, division into the units is an example, and is merely a logical function division. In actual implementation, another division manner may be used.

Figure 11:
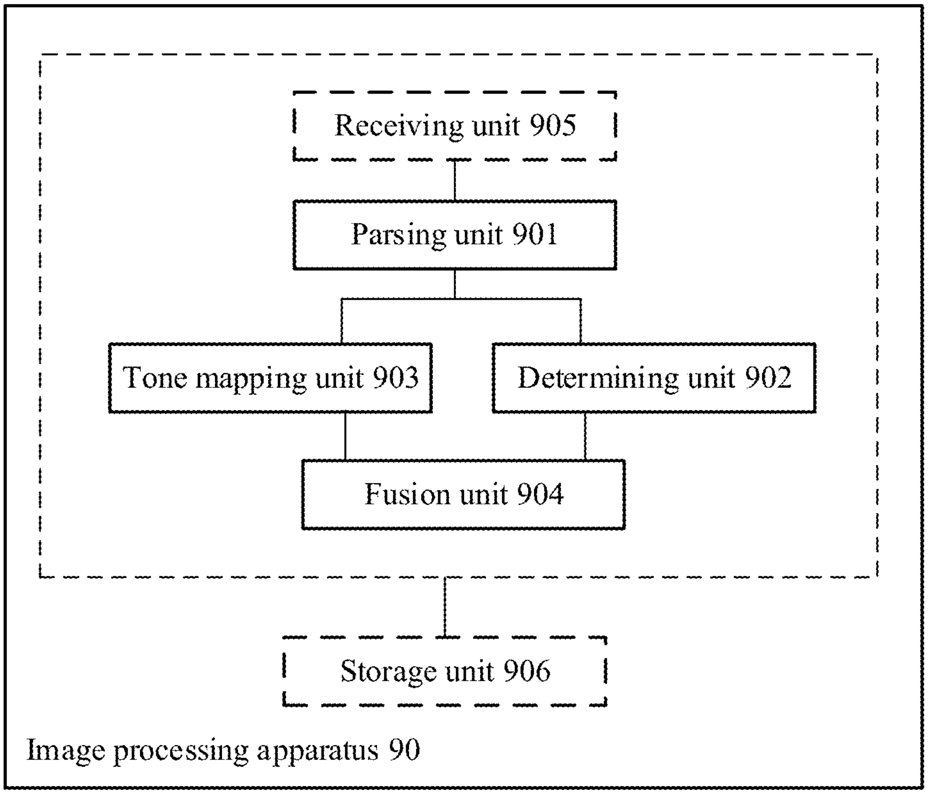
FIG. 11 is a diagram of composition of an image processing apparatus according to an embodiment of this application.

For example, FIG. 11 is a possible diagram of a structure of an image processing apparatus (denoted as an image processing apparatus 90) in the foregoing embodiment. The image processing apparatus 90 includes a parsing unit 901, a determining unit 902, a tone mapping unit 903, and a fusion unit 904. The parsing unit 901 is configured to parse an original bitstream of a to-be-processed image to obtain the to-be-processed image, for example, step S201 shown in FIG. 4. The parsing unit 901 is further configured to parse a first layered bitstream of the to-be-processed image to obtain a first layered image of the to-be-processed image, for example, step S202 shown in FIG. 4. The determining unit 902 is configured to determine a second layered image of the to-be-processed image based on the to-be-processed image and the first layered image, where the first layered image is a base layer image, and the second layered image is a detail layer image; or the first layered image is a detail layer image, and the second layered image is a base layer image, for example, step S203 shown in FIG. 4. The tone mapping unit

903 is configured to perform tone mapping on the base layer image to obtain a mapping result of the base layer image, for example, step S204 shown in FIG. 4. The fusion unit 904 is configured to fuse the mapping result of the base layer image and the detail layer image, for example, step S205 shown in FIG. 4.

Optionally, the first layered bitstream is a downsampled bitstream, and the parsing unit 901 is configured to: parse the first layered bitstream of the to-be-processed image to obtain a first initial layered image of the to-be-processed image; and perform upsampling on the first initial layered image to obtain the first layered image.

Optionally, the first layered image and the second layered image are single-channel images, or the first layered image and the second layered image are multi-channel images.

Optionally, the fusion unit 904 is configured to: obtain a processed detail layer image based on the detail layer image and a weight coefficient, where the weight coefficient represents superposition strength of the detail layer image; and fuse the mapping result of the base layer image and the processed detail layer image.

Optionally, the image processing apparatus 90 further includes a receiving unit 905, where the receiving unit 905 is configured to receive dual bitstreams, where the dual bitstreams include the original bitstream and the first layered bitstream.

Optionally, the image processing apparatus 90 further includes a storage unit 906. The storage unit 906 is configured to store computer-executable instructions, and another unit in the image processing apparatus may perform a corresponding action based on the computer-executable instructions stored in the storage unit 906.

For specific descriptions of the foregoing optional manners, refer to the foregoing method embodiments. Details are not described herein again. In addition, for any explanation of the image processing apparatus 90 provided above and descriptions of beneficial effect, refer to the foregoing corresponding method embodiments. Details are not described herein again.

In an example, with reference to FIG. 1, some or all functions implemented by the parsing unit 901, the determining unit 902, the tone mapping unit 903, the fusion unit 904, the receiving unit 905, and the storage unit 906 in the image processing apparatus 90 may be implemented by a processor 101 in FIG. 1 by executing program code in a memory 102 in FIG. 1. Alternatively, the receiving unit 905 may be implemented by using a receiving unit in a communication interface 103 in FIG. 1.

Figure 12:
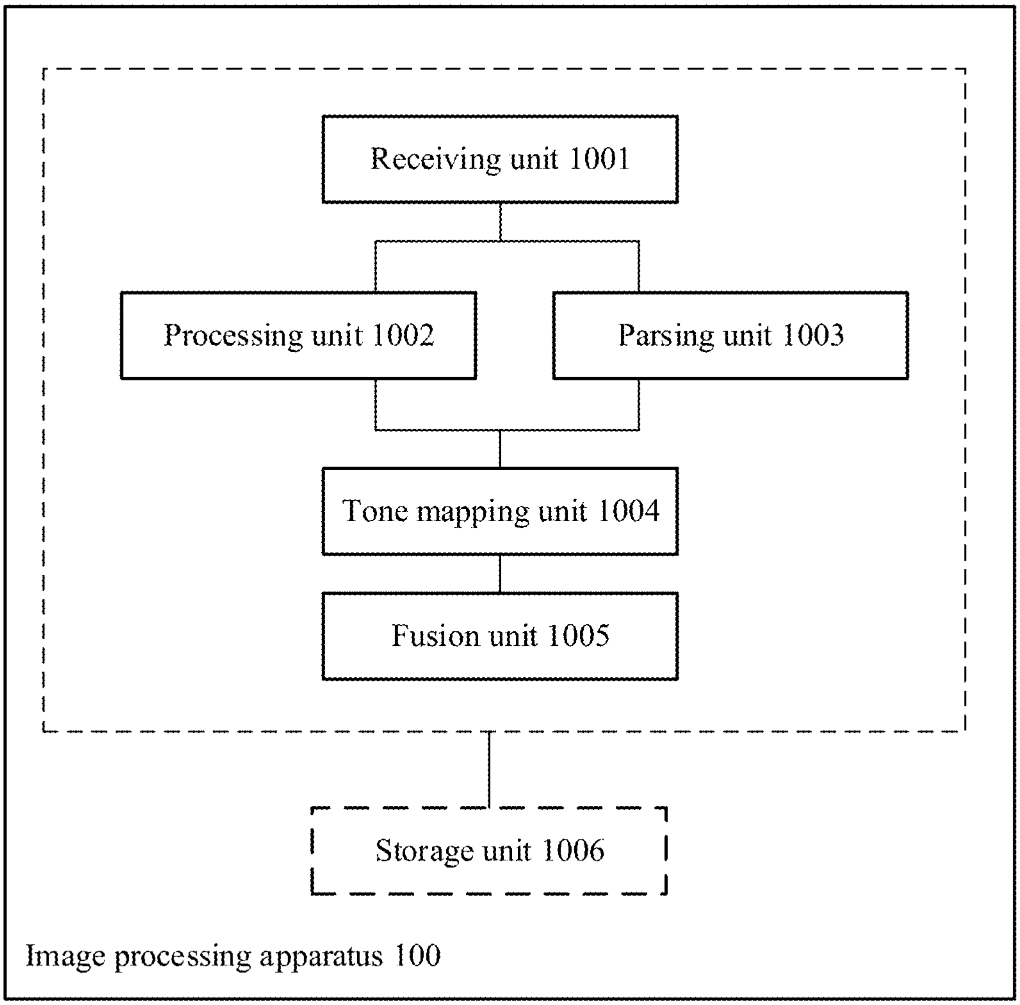
FIG. 12 is a diagram of composition of an image processing apparatus according to an embodiment of this application.

For example, FIG. 12 is a possible diagram of a structure of an image processing apparatus (denoted as an image processing apparatus 100) in the foregoing embodiment. The image processing apparatus 100 includes: a receiving unit 1001, configured to receive an original bitstream of a to-be-processed image and a first layered bitstream of the to-be-processed image; a processing unit 1002, configured to discard the first layered bitstream; a parsing unit 1003, configured to parse the original bitstream to obtain the to-be-processed image, where the processing unit 1002 is further configured to perform image layering on the to-be-processed image to obtain a base layer image and a detail layer image; a tone mapping unit 1004, configured to perform tone mapping on the base layer image to obtain a mapping result of the base layer image; and a fusion unit 1005, configured to fuse the mapping result of the base layer image and the detail layer image.

Optionally, the image processing apparatus 100 further includes a storage unit 1006. The storage unit 1006 is configured to store computer-executable instructions, and another unit in the image processing apparatus may perform a corresponding action based on the computer-executable instructions stored in the storage unit 1006.

For specific descriptions of the foregoing optional manners, refer to the foregoing method embodiments. Details are not described herein again. In addition, for any explanation of the image processing apparatus 100 provided above and descriptions of beneficial effect, refer to the foregoing corresponding method embodiments. Details are not described herein again.

In an example, with reference to FIG. 1, some or all functions implemented by the receiving unit 1001, the processing unit 1002, the parsing unit 1003, the tone mapping unit 1004, the fusion unit 1005, and the storage unit 1006 in the image processing apparatus 100 may be implemented by a processor 101 in FIG. 1 by executing program code in a memory 102 in FIG. 1. Alternatively, the receiving unit 1001 may be implemented by using a receiving unit in a communication interface 103 in FIG. 1.

An embodiment of this application further provides a computer-readable storage medium. The computer-readable storage medium stores a computer program. When the computer program is run on a computer, the computer performs the method performed by any image processing apparatus provided above.

For explanations of related content and descriptions of beneficial effect in any computer-readable storage medium provided above, refer to the foregoing corresponding embodiments. Details are not described herein again.

An embodiment of this application further provides a chip. The chip integrates a control circuit configured to implement functions of the image processing apparatus 90 and one or more ports. Optionally, for a function supported by the chip, refer to the foregoing description. Details are not described herein again. A person of ordinary skill in the art may understand that all or some of the steps of the foregoing embodiments may be implemented by a program instructing related hardware. The foregoing program may be stored in a computer-readable storage medium. The storage medium mentioned above may be a read-only memory, a random access memory, or the like. The processing unit or the processor may be a central processing unit, a general-purpose processor, an application-specific integrated circuit (ASIC), a microprocessor (DSP), a field programmable gate array (FPGA), another programmable logic device, a transistor logic device, a hardware component, or any combination thereof.

An embodiment of this application further provides a computer program product that includes instructions. When the instructions are run on a computer, the computer is enabled to perform any of the methods in the foregoing embodiments. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It should be noted that all the foregoing components provided in embodiments of this application and configured to store the computer instructions or the computer program, such as, but not limited to, the memory, the computer-readable storage medium, and a communication chip, are non-transitory (non-transitory).

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

Although this application is described with reference to embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An image processing method, comprising:

parsing an original bitstream of a to-be-processed image to obtain the to-be-processed image;

parsing a first layered bitstream of the to-be-processed image to obtain a first layered image of the to-be-processed image;

determining a second layered image of the to-be-processed image based on the to-be-processed image and the first layered image, wherein one of the first layered image and the second layered image is a base layer image, and the other of the first layered image and the second layered image is a detail layer image;

performing tone mapping on the base layer image to obtain a mapping result of the base layer image; and fusing the mapping result of the base layer image and the detail layer image.

2. The method of claim 1, wherein the first layered bitstream is a downsampled bitstream, and the parsing the first layered bitstream of the to-be-processed image to obtain the first layered image of the to-be-processed image comprises:

parsing the downsampled bitstream of the to-be-processed image to obtain a first initial layered image of the to-be-processed image; and performing upsampling on the first initial layered image to obtain the first layered image.

3. The method of claim 1, wherein the first layered image and the second layered image are single-channel images, or the first layered image and the second layered image are multi-channel images.

4. The method of claim 1, wherein the fusing the mapping result of the base layer image and the detail layer image comprises:

obtaining a processed detail layer image based on the detail layer image and a weight coefficient, wherein the weight coefficient represents superposition strength of the detail layer image; and fusing the mapping result of the base layer image and the processed detail layer image.

5. The method of claim 4, the method further comprising:

determining the weight coefficient base on the mapping result of the base layer image.

6. The method of claim 1, wherein before the parsing the original bitstream of the to-be-processed image and parsing the first layered bitstream of the to-be-processed image, the method further comprises:

receiving dual bitstreams that comprise the original bitstream and the first layered bitstream.

7. The method of claim 1, wherein before the parsing the original bitstream of the to-be-processed image and parsing the first layered bitstream of the to-be-processed image, the method further comprises:

receiving single bitstream that comprises the original bitstream, the first layered bitstream and synchronization information, wherein the synchronization information indicates corresponding locations of pixels in the to-be-processed image and the first layered image.

8. An image processing apparatus, comprising:

at least one processor; and a memory storing instructions that, when executed by the at least one processor, cause the image processing apparatus to:

parse an original bitstream of a to-be-processed image to obtain the to-be-processed image;

parse a first layered bitstream of the to-be-processed image to obtain a first layered image of the to-be-processed image;

determine a second layered image of the to-be-processed image based on the to-be-processed image and the first layered image, wherein one of the first layered image and the second layered image is a base layer image, and the other of the first layered image and the second layered image is a detail layer image;

perform tone mapping on the base layer image to obtain a mapping result of the base layer image; and fuse the mapping result of the base layer image and the detail layer image.

9. The apparatus of claim 8, wherein the first layered bitstream is a downsampled bitstream; and the at least one processor configured to execute the instructions to cause the image processing apparatus to:

parse the downsampled bitstream of the to-be-processed image to obtain a first initial layered image of the to-be-processed image; and perform upsampling on the first initial layered image to obtain the first layered image.

10. The apparatus of claim 8, wherein the first layered image and the second layered image are single-channel images, or the first layered image and the second layered image are multi-channel images.

11. The apparatus of claim 8, wherein the instructions, when executed by the at least one processor, further cause the image processing apparatus to:

obtain a processed detail layer image based on the detail layer image and a weight coefficient, wherein the weight coefficient represents superposition strength of the detail layer image; and fuse the mapping result of the base layer image and the processed detail layer image.

12. The apparatus of claim 11, wherein the instructions, when executed by the at least one processor, further cause the image processing apparatus to:

determine the weight coefficient base on the mapping result of the base layer image.

13. The apparatus of claim 8, wherein the instructions, when executed by the at least one processor, further cause the image processing apparatus to:

receive dual bitstreams that comprise the original bitstream and the first layered bitstream.

14. The apparatus of claim 8, wherein the instructions, when executed by the at least one processor, further cause the image processing apparatus to:

receive single bitstream that comprises the original bitstream, the first layered bitstream and synchronization information, wherein the synchronization information indicates corresponding locations of pixels in the to-be-processed image and the first layered image.

15. A non-transitory computer readable storage medium, storing a computer program that, when executed by a processor of an electronic device, causes the electronic device to:

parse an original bitstream of a to-be-processed image to obtain the to-be-processed image;

parse a first layered bitstream of the to-be-processed image to obtain a first layered image of the to-be-processed image;

determine a second layered image of the to-be-processed image based on the to-be-processed image and the first layered image, wherein one of the first layered image and the second layered image is a base layer image, and the other of the first layered image and the second layered image is a detail layer image;

perform tone mapping on the base layer image to obtain a mapping result of the base layer image; and fuse the mapping result of the base layer image and the detail layer image.

16. The non-transitory computer readable storage medium of claim 15, wherein the first layered bitstream is a downsampled bitstream; and the computer program, when executed by the processor, causes the electronic device to:

parse the downsampled bitstream of the to-be-processed image to obtain a first initial layered image of the to-be-processed image; and perform upsampling on the first initial layered image to obtain the first layered image.

17. The non-transitory computer readable storage medium of claim 15, wherein the first layered image and the second layered image are single-channel images, or the first layered image and the second layered image are multi-channel images.

18. The non-transitory computer readable storage medium of claim 15, wherein the computer program, when executed by the processor, causes the electronic device to:

obtain a processed detail layer image based on the detail layer image and a weight coefficient, wherein the weight coefficient represents superposition strength of the detail layer image; and fuse the mapping result of the base layer image and the processed detail layer image.

19. The non-transitory computer readable storage medium of claim 18, wherein the computer program, when executed by the processor, causes the electronic device to:

determine the weight coefficient base on the mapping result of the base layer image.

20. The non-transitory computer readable storage medium of claim 15, wherein the computer program, when executed by the processor, causes the electronic device to:

receive dual bitstreams that comprise the original bitstream and the first layered bitstream.

* * * * *